Patented May 29, 1934

UNITED STATES PATENT OFFICE 1,960,266

COMPOSITION FOR MOISTURE- AND WATER-PROOFING AND MATERIALS COATED THEREWITH

Russell L. Jenkins, Anniston, Ala., assignor to Swann Research, Incorporated, a corporation of Alabama No Drawing. Application October 19, 1932, Serial No. 638,529

20 Claims. (Cl. 91—68)

This invention relates to a composition of matter and more particularly to a composition of matter adapted not only to waterproof articles but to moistureproofing them as well.

One object of this invention is the provision of a coating composition which can be applied to cellulosic or other materials, such as paper, cloth, rayon, regenerated cellulosic sheets or the like, and improved moisture- and waterproofness obtained. A further object is the provision of moisture- and waterproof sheets or films, which can be used for wrapping food products, for electrical insulation, or the like. Further objects and advantages will become apparent as the disclosure proceeds.

For the production of coated paper and the like it has been proposed to utilize a combination of certain resins and waxes, those usually recommended consisting of various combinations of hard resins, such as shellac or phenolic condensation products, soft gums or other softening agents, and waxes.

I have now discovered that certain chlorinated diphenyl or polyphenyl resins, also referred to as chlorinated diaryl resins, may be combined in such proportions with wax or waxy substances, with or without the addition of plasticizers, so that improved moisture- and water-resistance is imparted to materials coated therewith. While combinations of the usual types of resins, plasticizers and waxes have long been used for treating paper and other materials to render them moisture- and water-resistant, I have, in experimenting with the chlorinated diphenyl resins, made the surprising discovery that the wax enhances not only the moistureproofness but also decreases the tackiness and further acts therein as a plasticizer or softening agent for the compound.

My coated products, as exemplified, for example, by a highly calendered glassine paper coated with my chlorinated diphenyl resin composition, has been found to have from 5 to 16 times the moisture-resistance of coated regenerated cellulosic sheets and from 3 to 140 or more times the moisture resistance of ordinary coated papers.

The new effect which is exhibited by mixtures of chlorinated diphenyl resin and wax, I believe to be the result of the peculiar compatibility of the wax in this particular resin or resin mixtures containing the same. This unusual type of compatibility is characterized by a slowly changing solubility limit over a period of time up to several weeks, manifesting itself by the increasing capacity of those mixtures having as little as 2 to 4 percent of paraffin wax dissolved in the resin. It is probable that not only does an actual separation of the wax from the resin occur, but it is further evident, from the results of actual moisture transmission experiments, that such separated wax exists as a very thin and continuous film on the surface, through which moisture can penetrate only with difficulty. This effect is particularly a property of the hard waxes; the softer varieties having a somewhat greater solubility in the resin.

Further advantages which I may attribute to the chlorinated diphenyl resins are due to the discovery that extremely light-colored, odorless mixtures may be compounded. They are furthermore sufficiently stable so that exposure to light and air will not alter the physical or chemical properties, and hence will not destroy the moisture resistance or flexibility of the sheeted products coated therewith.

Such chlorinated diphenyl resin-wax mixtures are also characterized by complete miscibility in the molten state, while in the solid state compatibility is limited to less than 2 percent of wax. This means that above the compatibility limit the wax separates from the solid resin at room temperature or even before room temperature is reached. Higher percentages of paraffin wax in the composition result in a three-fold improvement in coated products. There is, for example, a pronounced improvement in moisture-resistance, a less tacky surface, and a more rapid exudation or separation of the wax than when smaller percentages of wax are used. For most purposes I have found from 8 to 10 percent of wax in the composition to be sufficient for optimum results.

For the purpose of this invention I regard as equivalents paraffin wax, beeswax, montan wax, Japan wax, candelilla, carnauba, ozokerite or ceresin.

The chlorinated diphenyl resins which I have found to have the particular properties herein described may be produced by the procedure described in U. S. Patent 1,892,400, particularly by Examples V, VI, VII or VIII of this patent. I have found that the non-crystalline varieties illustrated by Example VI and which furthermore have a softening point of 75° C. and above, are to be recommended for most purposes where a fairly hard coating material is to be produced.

As an example of the compositions contemplated herein, I give the following specific examples, altho I do not wish to be understood as limiting myself thereby:—

Example I

Melt together, with stirring 97 parts by weight of a chlorinated diphenyl resin such as that disclosed in Example VI of U. S. Patent No. 1,892,400.

which resin has a softening point, by the A. S. T. M. method, in the neighborhood of 76° C., with 3 parts by weight of a paraffin wax. The homogeneous resin-wax mixture is then applied to sheets of bond or glassine paper, or other type of cellulosic material suitable for coating, by dipping the paper directly into the molten mass, allowing the excess to drain, or removing the excess, as in a machine, by doctor knives or scrapers.

Such coated paper will ordinarily, almost immediately develop a fairly non-tacky surface with good water- and moisture-resistance, and will become less tacky upon standing. Such paper has been tested against liquid water at ordinary temperatures and has been found to resist the penetration of liquid water for periods in excess of 24 hours.

I have caused Japanese bond paper impregnated with varying percentages of paraffin wax mixtures with the above-mentioned chlorinated diphenyl resin to be tested against liquid water in the following manner: A mechanical mixture of a water-soluble dry powdered dye (duPont's scarlet) and powdered sugar was placed in a thin layer on a glass plate of 2" x 2" size. The impregnated paper was placed over the dye-sugar mixture and the edges of the paper sealed to the glass plate with heavy coats of the chlorinated diphenyl resin. The whole structure was then immersed in water until failure of the treated paper was indicated by a color change of the dye-sugar mixture.

The paper, before coating, was approximately 0.0035" thick on the average, the film thickness noted in the table below being the increase due to the impregnation treatment. The results below illustrate the water resistance offered by my treated paper as well as the plasticizing and tack-reducing effect of small amounts of wax:—

| Composition of mixture | Brittleness | Feel | Film thickness | Time to penetrate treated paper |
|---|---|---|---|---|
| 1. Chlorinated diphenyl resin+0.25% paraffin | Very brittle | Tacky | 0.0057" | 3 days |
| 2. Chlorinated diphenyl resin+0.50% paraffin | Less brittle | Tacky | 0.0090" | 4 days |
| 3. Chlorinated diphenyl resin+0.75% paraffin | Less brittle | Tacky | 0.0057" | 5 days |
| 4. Chlorinated diphenyl resin+1.00% paraffin | Less brittle | Tacky | 0.0065" | 3 days |
| 5. Chlorinated diphenyl resin+1.50% paraffin | Less brittle | Slight greasiness; tacky. | 0.0030" | 2 days |
| 6. Chlorinated diphenyl resin+2.00% paraffin | Less brittle | Greasier; less tacky. | 0 0010" | 1 day |
| 7. Chlorinated diphenyl resin+2.50% paraffin | Less brittle | Greasier; less tacky. | 0.0012" | 1 day |
| 8. Chlorinated diphenyl resin+3.00% paraffin | Less brittle | Greasier; less tacky. | 0.0012 | 1 day |

The above data show that a maximum resistance is offered by paper impregnated with a 0.75% paraffin mixture. Increasing the paraffin to 2.00% decreases the water resistance somewhat, after which further increases of paraffin again slowly increases the resistance. The plasticizing effect of the wax-resin mixture is seen to increase directly with increasing amounts of wax, the surface of the paper becoming less tacky and somewhat greasier to the touch as the wax content increases.

For the production of relatively tack-free moistureproof coatings on transparent sheets or films such as regenerated cellulose, it is desirable that a somehat larger percentage of wax be employed in the chlorinated diphenyl resin, in order to decrease the rate of moisture transmission through the film. In order to maintain transparency of the coated film, it is desirable that the amount of wax be not greater than 10% by weight, while 8% is the usual practical limit. Greater percentages than 8% to 10% will cause a blush to develop on the surface which will increase with greater amounts of wax; however, if the blush resulting from the use of more than 8% to 10% of wax in the chlorinated diphenyl resin is not objectionable, greater amounts of wax may even be employed.

The cellulosic or regenerated cellulosic sheets may be coated by any well known method such as by passing a sheet through a bath of the molten moistureproofing material in a machine equipped with scrapers or knives, which are set to scrape off the excess material. In certain cases it may be desirable to dissolve the mixture of chlorinated diphenyl resin in an organic solvent and employ such solution in coating, the solvent being evaporated leaving a film of moistureproof material on the sheet. By varying the concentration of the resin-wax mixture in the solvent, the thickness of the moistureproofing material deposited on the coated sheet may be varied.

While I have discovered that waxes in general, and paraffin or beeswax in particular, exert a pronounced plasticizing effect when mixed with the chlorinated diphenyl resin, it should not be supposed that additional plasticizers may not be used with advantage for certain purposes where increased flexibility is required. The effect of the plasticizer is to increase the rate at which the wax separates from the resin mixture.

*Example II*

In general where combinations of three materials are used, I prefer to use the ingredients thereof in the following approximate proportions:—chlorinated diphenyl resin of 65° or 75° C. softening point, 84 parts; paraffin wax, 10 parts; dibutyl phthalate, 6 parts.

While various plasticizers may be employed in the three-component mixtures just mentioned, I have found that all plasticizers do not exert the same plasticizing effect in the chlorinated diphenyl resin mixture. I have found that in general 6% of dibutyl phthalate is equivalent to approximately 8.5% of castor oil or 10.5% of a water-white mineral oil. If less plasticizer is used, the proportions of the various plasticizers are somewhat closer together. For example, 4% of dibutyl phthalate is equivalent to 4.7% castor oil or 6% mineral oil.

*Example III*

Since I also contemplate the use of other resins in admixture with the chlorinated diphenyl resin, it should be stated that the effect of such admixture will be to materially harden the resulting mixture. Resins such as dammar, rosin or ester gum may be used. If not too great a proportion of such odoriferous resins as dammar are employed, the odor of the resulting mixture will be greatly decreased. For most purposes I have found ester gum to be satisfactory for the production of odorless products.

A satisfactory four-component mixture may contain in parts by weight:—

| | |
|---|---|
| Chlorinated diphenyl resin 65° to 75° softening point | 39.0 |
| Ester gum | 45.0 |
| Hard paraffin | 8.0 |
| Mineral oil (liquid petrolatum) | 8.00 |

Such a mixture is compounded by melting the ingredients together. Since the refractive index of this mixture approximates that of cellulosic fibre, I have found that it will markedly increase the transparency of paper and can be used especially with highly calendered papers, such as glassine, for the manufacture of transparent moistureproof wrapping materials. Application to paper is made by the usual type of coating machine in which the paper is exposed to the molten material, the excess scraped off, and the coated paper allowed to cool. If desirable, the same mixture may be applied from a solution in organic solvents such as benzine or toluene.

Where it is desired to employ other natural or synthetic resins together with the chlorinated diphenyl resin in a four-component mixture, it will usually be found that the percentage of such other resin may equal or even exceed the percentage of the chlorinated diphenyl resin. The development of moistureproofness will, however, proceed in much the same manner as in the three-component mixtures, that is by the separation of a portion of the wax and its exudation and spreading in a continuous film upon the surface of the article coated therewith.

The materials mentioned in the above examples may be applied to sheets or films of paper or to modified or regenerated cellulosic sheets whether made from cellulose acetate, nitrate or viscose. Such coated products will show an improved resistance to moisture transmission; in many cases the resistance has been increased 80 to 135 fold or more over the untreated material.

While I have described several specific embodiments of my invention, it should be understood that it is not so limited, but that it is susceptible to various changes and modifications such as will be readily apparent to one skilled in the art, and I therefore do not wish to be limited thereby except as indicated by the prior art or as is specifically set forth in the appended claims.

I claim:—

1. An article of manufacture comprising a sheet or film of cellulosic material coated with a chlorinated diaryl resin and a wax.

2. An article of manufacture comprising a sheet or film of cellulosic material coated with chlorinated diphenyl resin and a wax.

3. An article of manufacture comprising a sheet or film of cellulosic material coated with a chlorinated diphenyl resin, a wax and a plasticizer.

4. An article of manufacture comprising a sheet or film of cellulosic material coated with a chlorinated diphenyl containing resin and a paraffin wax.

5. An article of manufacture comprising a sheet or film of cellulosic material coated with a chlorinated diphenyl containing resin, a paraffin wax and a plasticizer.

6. An article of manufacture comprising a sheet or film of cellulose material coated with a mixture of resins comprising in part a chlorinated diphenyl resin, together with a minor amount of paraffin wax.

7. An article of manufacture comprising a sheet or film of cellulosic material coated with a mixture of resins comprising in part a chlorinated diphenyl resin, together with an amount of paraffin wax sufficient to make said article substantially tack-free to the touch.

8. A moistureproofing composition comprising a chlorinated diphenyl resin and a wax.

9. A moistureproofing composition comprising a chlorinated diphenyl resin, a wax and a plasticizer or softening agent.

10. A moistureproofing composition comprising a chlorinated diphenyl resin, and a wax in such proportion as to yield a substantially tack-free composition.

11. A moistureproofing composition comprising a chlorinated diphenyl resin, a plasticizer and a wax in such proportions as to yield a substantially tack-free composition.

12. A moistureproofing composition comprising a chlorinated diaryl resin having a softening point ranging between 65 and 75° C. and a wax compatible therewith while in the molten condition and capable of separating therefrom while in the solid state.

13. A moistureproofing composition comprising a chlorinated diphenyl resin having a softening point ranging between 65 and 75° C. and a wax compatible therewith while in the molten condition and capable of separating slowly therefrom while in the solid state.

14. A non-tacky moistureproofing composition comprising in admixture a chlorinated diphenyl resin, a second resin miscible therewith, a wax and a plasticizer.

15. A non-tacky moistureproofing composition comprising in admixture a chlorinated diphenyl resin, a second resin miscible therewith, a wax and a plasticizer, said wax being present in amount greater than the compatible limit of said wax in the mixture.

16. A non-tacky moistureproofing composition comprising in admixture a chlorinated diphenyl resin, a second resin miscible therewith, a wax and a plasticizer, said wax being present in amount greater than 2 percent by weight of said mixture.

17. A non-tacky moistureproofing composition comprising, in admixture, a chlorinated diphenyl resin, ester gum, paraffin wax and a plasticizer, the wax being present in amount greater than the compatible limit of said wax in said mixture.

18. A non-tacky moistureproofing composition comprising a mixture of a chlorinated diphenyl resin, a second resin miscible therewith, a wax and a plasticizer, the said mixture having approximately the refractive index of cellulosic fibres.

19. A moistureproofing composition having approximately the composition in parts by weight:—

| | |
|---|---|
| Chlorinated diphenyl resin | 39.0 |
| Ester gum | 45.0 |
| Hard paraffin | 8.0 |
| Mineral oil | 8.0 |

20. A moistureproofing composition comprising a chlorinated diphenyl resin, a second resin miscible therewith, a wax and a mineral oil plasticizer, the chlorinated diphenyl resin being present in amount less than said second resin and the wax being present in amount greater than the compatable limit of said wax in said mixture.

RUSSELL L. JENKINS.

CERTIFICATE OF CORRECTION.

Patent No. 1,960,266. May 29, 1934.

RUSSELL L. JENKINS

It is hereby certified that error appears in the printed specification of the above numbered patent requiring correction as follows: Page 1, line 56, for "capacity" read opacity ; and that the said Letters Patent should be read with this correction therein that the same may conform to the record of the case in the Patent Office.

Signed and sealed this 29th day of October, A. D. 1935.

(Seal)

Leslie Frazer
Acting Commissioner of Patents.

DISCLAIMER 1,960,266.—*Russell L. Jenkins*, Anniston, Ala. COMPOSITIONS FOR MOISTURE- AND WATERPROOFING AND MATERIALS COATED THEREWITH. Patent dated May 29, 1934. Disclaimer filed October 17, 1935, by the patentee, with the assignee, *Swann Research, Incorporated*, affirming and accepting.

Hereby disclaims from the expressions, "a chlorinated diaryl resin" (appearing in claims 1 and 12), "chlorinated diphenyl resin" (appearing in claims 2 and 19), "a chlorinated diphenyl resin" (appearing in claims 3, 6, 7, 8, 9, 10, 11, 13, 14, 15, 16, 17, 18, and 20), and "a chlorinated diphenyl containing resin" (appearing in claims 4 and 5), resins which are produced by some other or additional resin producing operation than the direct chlorination of diphenyl and related polyaryls, substantially as described in United States Patent No. 1,892,400, to which your petitioner referred in his Patent No. 1,960,266.

[*Official Gazette November 5, 1935.*]